United States Patent
Chopra et al.

(10) Patent No.: US 12,033,162 B2
(45) Date of Patent: Jul. 9, 2024

(54) AUTOMATED ANALYSIS OF CUSTOMER INTERACTION TEXT TO GENERATE CUSTOMER INTENT INFORMATION AND HIERARCHY OF CUSTOMER ISSUES

(71) Applicant: FMR LLC, Boston, MA (US)

(72) Inventors: Ankush Chopra, Bangalore (IN); Debasis Bal, Bangalore (IN); Sohom Ghosh, Burdwan (IN)

(73) Assignee: FMR LLC, Boston, MA (US)

( * ) Notice: Subject to any disclaimer, the term of this patent is extended or adjusted under 35 U.S.C. 154(b) by 288 days.

(21) Appl. No.: 17/500,614

(22) Filed: Oct. 13, 2021

(65) Prior Publication Data

US 2023/0112369 A1     Apr. 13, 2023

(51) Int. Cl.
| | |
|---|---|
| *G06Q 30/01* | (2023.01) |
| *G06F 18/2135* | (2023.01) |
| *G06F 18/22* | (2023.01) |
| *G06F 40/284* | (2020.01) |
| *G06N 3/044* | (2023.01) |
| *G06N 3/08* | (2023.01) |
| *G06Q 30/016* | (2023.01) |

(52) U.S. Cl.
CPC ..... *G06Q 30/016* (2013.01); *G06F 18/21355* (2023.01); *G06F 18/22* (2023.01); *G06F 40/284* (2020.01); *G06N 3/044* (2023.01); *G06N 3/08* (2013.01)

(58) Field of Classification Search
CPC .................................................. G06F 40/284
See application file for complete search history.

(56) References Cited

U.S. PATENT DOCUMENTS

| | | | |
|---|---|---|---|
| 10,311,377 B2 | 6/2019 | Vijayaraghavan et al. | |
| 10,445,745 B1 | 10/2019 | Chopra et al. | |
| 10,467,261 B1 * | 11/2019 | Doyle | G06F 16/248 |
| 10,740,566 B2 | 8/2020 | Sapugay et al. | |
| 10,957,311 B2 | 3/2021 | Solomon et al. | |

(Continued)

OTHER PUBLICATIONS

A. Tripathi, "Named Entity Recognition NER using spaCy | NLP | Part 4," towards data science, available at https://towardsdatascience.com/named-entity-recognition-ner-using-spacy-nlp-part-4-28da2ece57c6, Apr. 26, 2020, 9 pages.

*Primary Examiner* — Vincent M Cao
(74) *Attorney, Agent, or Firm* — Cesari & McKenna, LLP

(57) ABSTRACT

Methods and apparatuses are described for automated analysis of customer interaction text to generate customer intent information and a hierarchy of customer issues. A server captures computer text segments including a first portion comprising a transcript of an interaction and a second portion comprising notes about the interaction. The server generates interaction embeddings corresponding to the first portion of the computer text segment for a trained neural network. The server executes the neural network using the interaction embeddings to generate an interaction summary for each computer text segment. The server converts each interaction summary into a multidimensional vector and aggregates the multidimensional vectors into clusters based upon a similarity measure. The server aligns the clusters of vectors with attributes of the interaction summaries to generate a hierarchical mapping of customer issues.

18 Claims, 14 Drawing Sheets

(56) References Cited

U.S. PATENT DOCUMENTS

| | | | | |
|---|---|---|---|---|
| 2018/0287968 | A1* | 10/2018 | Koukoumidis | G06F 40/289 |
| 2019/0220695 | A1* | 7/2019 | Nefedov | G06F 16/285 |
| 2019/0325066 | A1* | 10/2019 | Krishna | G06F 16/3347 |
| 2019/0362021 | A1* | 11/2019 | Balduino | G06Q 30/01 |
| 2020/0089765 | A1* | 3/2020 | Jayaraman | G06N 3/084 |
| 2020/0380021 | A1* | 12/2020 | Barbour | G06F 16/313 |
| 2021/0110254 | A1* | 4/2021 | Hoang | G06F 40/58 |
| 2021/0133581 | A1* | 5/2021 | Podgorny | G06F 40/35 |
| 2021/0134279 | A1* | 5/2021 | Mallenahally | G10L 15/1822 |
| 2021/0304747 | A1* | 9/2021 | Haas | G10L 15/22 |
| 2021/0319481 | A1* | 10/2021 | Maheswaran | G06Q 30/0281 |
| 2021/0328888 | A1* | 10/2021 | Rath | H04L 41/5074 |
| 2022/0075936 | A1* | 3/2022 | Paradkar | G06F 16/3329 |
| 2022/0121886 | A1* | 4/2022 | Jahjah | G06F 18/24155 |
| 2022/0309250 | A1* | 9/2022 | Das | G06N 3/08 |

\* cited by examiner

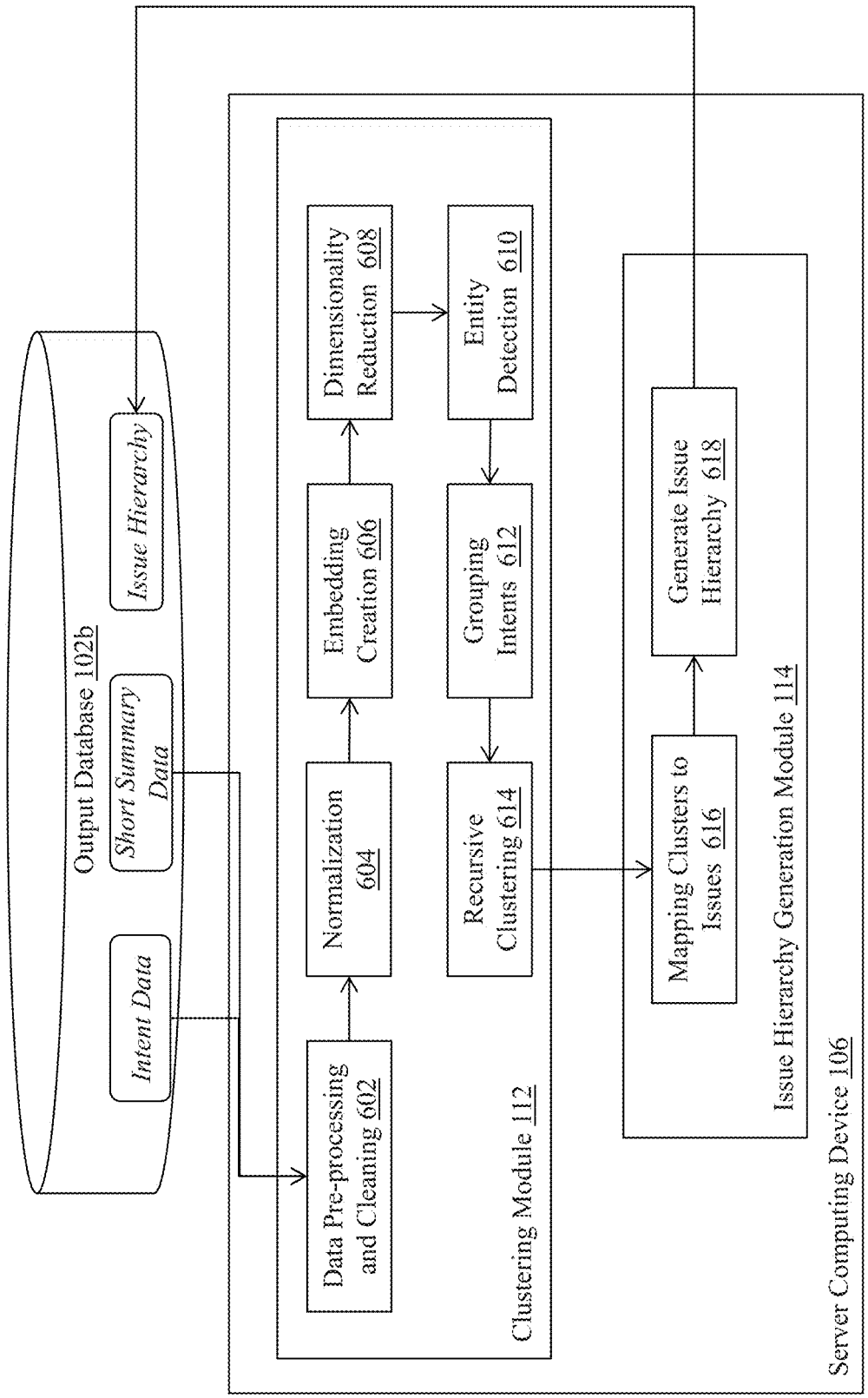

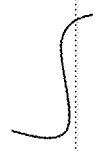

| Cleaned interaction intent |
|---|
| electronic fund transfer from to |
| electronic fund transfer status |
| electronic fund transfer contribution |
| electronic fund transfer collection period |
| sent electronic fund transfer ekit |
| set up electronic fund transfer |
| about electronic fund transfer |
| ekit for electronic fund transfer |
| setting up electronic fund transfer |
| employee stock purchase plan |
| employee stock purchase plan enrollment |
| employee stock purchase plan purchase |
| employee stock purchase plan contribution |
| wire instructions |
| went over wire instructions |
| ekit for wire instructions |

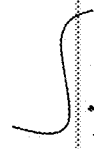

| Customer intents stored in the database |
|---|
| cci electronic fund transfer from to |
| customer called in for eft status |
| electronic fund transfer contribution |
| electronic fund transfer collection period |
| sent electronic fund transfer ekit |
| set up electronic fund transfer |
| about electronic fund transfer |
| ekit for electronic fund transfer |
| setting up electronic fund transfer |
| employee stock purchase plan |
| customer called for espp enrollment |
| employee stock purchase plan purchase |
| employee stock purchase plan contribution |
| person called to enquire about wire instructions |
| went over wire instructions |
| ekit for wire instructions |

FIG. 7

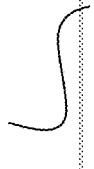

| cleaned interaction intent | Embeddings |
|---|---|
| electronic fund transfer from to | [0.2,0.65,0.334..... |
| electronic fund transfer status | [0.9,0.32,0.54..... |
| electronic fund transfer contribution | [0.3,0.65,0.876..... |
| electronic fund transfer collection period | [0.11,0.32,0.87,0.4..... |
| sent electronic fund transfer ekit | [0.23,0.34,0.49,0.33..... |
| set up electronic fund transfer | [0.1,0.5,0.78,0.3..... |
| about electronic fund transfer | [0.9,0.443, 0.12, 0.43.... |
| ekit for electronic fund transfer | [0.2,0.65,0.334..... |
| setting up electronic fund transfer | [0.9,0.32,0.54..... |
| employee stock purchase plan | [0.3,0.65,0.876..... |
| employee stock purchase plan enrollment | [0.11,0.32,0.87,0.4..... |
| employee stock purchase plan purchase | [0.23,0.34,0.49,0.33..... |
| employee stock purchase plan contribution | [0.1,0.5,0.78,0.3..... |
| wire instructions | [0.9,0.443, 0.12, 0.43.... |
| went over wire instructions | [0.2,0.65,0.334..... |
| ekit for wire instructions | [0.9,0.32,0.54..... |

FIG. 8

| Cleaned interaction intent | Detected Entities |
|---|---|
| electronic fund transfer from to | electronic fund transfer |
| electronic fund transfer status | electronic fund transfer |
| electronic fund transfer contribution | electronic fund transfer |
| electronic fund transfer collection period | electronic fund transfer |
| sent electronic fund transfer ekit | ekit for electronic fund transfer, electronic fund transfer |
| set up electronic fund transfer | ekit for electronic fund transfer, electronic fund transfer |
| about electronic fund transfer | ekit for electronic fund transfer, electronic fund transfer |
| ekit for electronic fund transfer | ekit for electronic fund transfer, electronic fund transfer |
| setting up electronic fund transfer | ekit for electronic fund transfer, electronic fund transfer |
| employee stock purchase plan | ESPP |
| employee stock purchase plan enrollment | ESPP |
| employee stock purchase plan purchase | ESPP |
| employee stock purchase plan contribution | ESPP |
| wire instructions | wire transfer |
| went over wire instructions | wire transfer |
| ekit for wire instructions | wire transfer |

FIG. 11

| Cleaned interaction intent | Grouped Entities |
|---|---|
| electronic fund transfer from to | electronic fund transfer |
| electronic fund transfer status | |
| electronic fund transfer contribution | |
| electronic fund transfer collection period | |
| sent electronic fund transfer ekit | ekit for electronic fund transfer |
| set up electronic fund transfer | |
| about electronic fund transfer | |
| ekit for electronic fund transfer | |
| setting up electronic fund transfer | |
| wire instructions | wire transfer |
| went over wire instructions | |
| ekit for wire instructions | |
| employee stock purchase plan | ESPP |
| employee stock purchase plan enrollment | |
| employee stock purchase plan purchase | |
| employee stock purchase plan contribution | |

FIG. 12

| Cleaned interaction intent | Cluster-Level1 | Cluster-Level2 | Cluster-Level3 |
|---|---|---|---|
| electronic fund transfer from to | electronic fund transfer | electronic fund transfer | Money Movement |
| electronic fund transfer status | | | |
| electronic fund transfer contribution | | | |
| electronic fund transfer collection period | | | |
| sent electronic fund transfer ekit | ekit for electronic fund transfer | | |
| set up electronic fund transfer | | | |
| about electronic fund transfer | | | |
| ekit for electronic fund transfer | | | |
| setting up electronic fund transfer | | | |
| wire instructions | wire transfer | wire transfer | |
| went over wire instructions | | | |
| ekit for wire instructions | | | |
| employee stock purchase plan | ESPP | ESPP | ESPP |
| employee stock purchase plan enrollment | | | |
| employee stock purchase plan purchase | | | |
| employee stock purchase plan contribution | | | |

FIG. 13

| money movement | | | | |
|---|---|---|---|---|
| ⊞ electronic fund transfer | | | | 23366 |
| ⊞ sent edit for electronic fund transfer | | | | 6328 |
| ⊞ journal | | | | 5703 |
| ⊞ wire instructions | ⊞ wire instructions | ⊞ wire instructions | | 2615 |
| | | | ⊞ wire instructions | 5 |
| | | | ⊞ went over wire instructions | 5 |
| | | | ⊞ edit for wire instructions | 4 |
| | | | ⊞ about wire instructions | 1 |
| | | ⊞ provided wire instructions | | 27 |
| | | ⊞ wiring instructions | | 10 |
| | ⊞ wire | ⊞ wire | | 1487 |
| | | ⊞ wire info | | 12 |
| | | ⊞ wire form | | 4 |
| | | ⊞ wire to has | | 1 |
| | ⊞ wire trace | | | 171 |

FIG. 14

AUTOMATED ANALYSIS OF CUSTOMER INTERACTION TEXT TO GENERATE CUSTOMER INTENT INFORMATION AND HIERARCHY OF CUSTOMER ISSUES

TECHNICAL FIELD

This application relates generally to methods and apparatuses, including computer program products, for automated analysis of customer interaction text to generate customer intent information and a hierarchy of customer issues.

BACKGROUND

Large consumer-facing companies constantly face a challenge of retaining their existing customers and expanding to reach new customers, especially considering the fragmentation and diversity of customer bases. Companies want to understand the reasons behind customer interactions in order to provide better service, identify trends, and handle future customer inquiries more efficiently. For example, customers can interact with a company through various channels like web search, calls, chat and emails; either looking for information (specific or generic) or for service needs regarding products, services and new offerings from the company. These interactions form a very valuable source of information for customer insights, and need to be preserved and processed. Typically, however, these interactions are somewhat long in nature and customer service representatives (CSRs) and agents who receive and respond to these interactions do so in a reactive and hurried manner.

For example, some agents enter a brief summary or notes of the specific interaction, noting the reasons behind the customer interaction, such as issue(s) faced by customers or product interests of customers. However, more often than not, the agent is incentivized to conclude the interaction quickly and handle the next customer, so the notes are either skipped altogether or the notes are incomplete or inadequate due to lack of time.

In addition, analyzing these customer interactions offline is a time consuming and tedious endeavor, because the conversations are usually lengthy-including all the elements of a normal conversation (e.g., greetings, pauses, small talk) with actionable customer information somewhere within. The nature of these interactions makes identifying the intent behind the interactions difficult and makes any proactive planning for information or service needs very cumbersome. Furthermore, in existing systems even for a small set of interactions in which notes are provided by CSRs, the notes are not standardized-leading to increased time for analyzing and understanding the actionable information.

SUMMARY

Therefore, what is needed are methods and systems for automated analysis of customer interaction text to generate customer intent information and a hierarchy of customer issues that leverage advanced text processing, vectorization, and clustering techniques to automatically generate customer intents from unstructured text such as interaction transcripts and agent notes, while also enabling the agent to provide feedback on the generated intents. The techniques described herein also beneficially standardize and group the intents according to company-specific entities detected in the intent information, in order to provide a robust customer issue hierarchy that can be used to quickly analyze a broad picture of customer interaction needs and trends.

The invention, in one aspect, features a computerized method of automated analysis of customer interaction text to generate customer intent information and a hierarchy of customer issues. A server computing device captures a plurality of computer text segments, each segment including (i) a first portion comprising a transcript of an interaction between a customer and an agent and (ii) a second portion comprising notes about the interaction between the customer and the agent, as generated by the agent. The server computing device generates, for each computer text segment, an interaction embedding for a trained neural network, the interaction embedding comprising a word embedding corresponding to the first portion of the computer text segment, the neural network trained using at least a portion of the plurality of computer text segments. The server computing device executes the trained neural network using the interaction embeddings to generate an interaction summary for each computer text segment, the interaction summary comprising a text string identifying a primary topic of the first portion of the computer text segment. The server computing device converts each interaction summary into a multidimensional vector representing the interaction summary. The server computing device aggregates the multidimensional vectors into one or more clusters based upon a similarity measure between the respective multidimensional vectors. The server computing device aligns the one or more clusters of vectors with attributes of the interaction summaries to generate a hierarchical mapping of customer issues.

The invention, in another aspect, features a computer system for automated analysis of customer interaction text to generate customer intent information and a hierarchy of customer issues. The computer system includes a server computing device having a memory for storing computer-executable instructions and a processor that executes the computer-executable instructions. The server computing device captures a plurality of computer text segments, each segment including (i) a first portion comprising a transcript of an interaction between a customer and an agent and (ii) a second portion comprising notes about the interaction between the customer and the agent, as generated by the agent. The server computing device generates, for each computer text segment, an interaction embedding for a trained neural network, the interaction embedding comprising a word embedding corresponding to the first portion of the computer text segment, the neural network trained using at least a portion of the plurality of computer text segments. The server computing device executes the trained neural network using the interaction embeddings to generate an interaction summary for each computer text segment, the interaction summary comprising a text string identifying a primary topic of the first portion of the computer text segment. The server computing device converts each interaction summary into a multidimensional vector representing the interaction summary. The server computing device aggregates the multidimensional vectors into one or more clusters based upon a similarity measure between the respective multidimensional vectors. The server computing device aligns the one or more clusters of vectors with attributes of the interaction summaries to generate a hierarchical mapping of customer issues.

Any of the above aspects can include one or more of the following features. In some embodiments, generating an interaction embedding comprises tokenizing, by the server computing device, the computer text segment into a plurality of tokens; and encoding, by the server computing device, the plurality of tokens for the computer text segment into the interaction embedding. In some embodiments, the server computing device cleans the computer text segment before tokenizing the computer text segment. In some embodiments, cleaning the computer text segment comprises one or more of: removal of stopwords, removal of system messages, conversion to lower case, consolidate white space, replacement of masked information, removal of non-vocalized noise, or replacement of contractions. In some embodiments, the server computing device uses a one-hot encoder to encode the plurality of tokens for the computer text segment into the interaction embedding.

In some embodiments, the trained neural network comprises a Long Short-term Memory (LSTM) architecture. In some embodiments, the interaction between a customer and an agent comprises a voice call session or a text chat session.

In some embodiments, converting each interaction summary into a multidimensional vector representing the interaction summary comprises executing, by the server computing device, a trained language processing model using the interaction summary as input to generate the multidimensional vector. In some embodiments, the multidimensional vector is a phrase embedding. In some embodiments, the server computing device cleans the interaction summary before converting the interaction summary into a multidimensional vector. In some embodiments, the server computing device standardizes the multidimensional vectors and reduces a number of dimensions of each multidimensional vector.

In some embodiments, the server computing device executes a named entity recognition model using the interaction summaries as input to identify one or more named entities in the interaction summaries. In some embodiments, aggregating the multidimensional vectors into one or more clusters based upon a similarity measure between the respective multidimensional vectors comprises assigning one or more named entities to each interaction summary based upon the named entity recognition model, segregating the interaction summaries into groups based on the associated named entities, and clustering the vectors in each group using the similarity measure. In some embodiments, the server computing device receives one or more changes to the generated interaction summary from a client computing device, and retrains the trained neural network using the changed interaction summary.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 6 is a detailed flow diagram of an illustrative embodiment of the processing performed by the clustering module and the issue hierarchy generation module of the server computing device.

FIG. 7 is a diagram showing exemplary intents generated by the system before and after the pre-processing and cleaning step and normalizing step of FIG. 6.

FIG. 8 is a diagram showing exemplary initial embeddings generated by the system from the cleaned and normalized intents.

FIG. 11 is a diagram showing exemplary entities detected by the system from the cleaned intents.

FIG. 12 is a diagram of exemplary grouping performed by the system on the tagged intents.

FIG. 13 is a diagram of an exemplary issue cluster hierarchy generated by the system.

FIG. 14 is a diagram of an exemplary graphical user interface that displays a portion of the fully-generated issue hierarchy.

DETAILED DESCRIPTION

Figure 1:
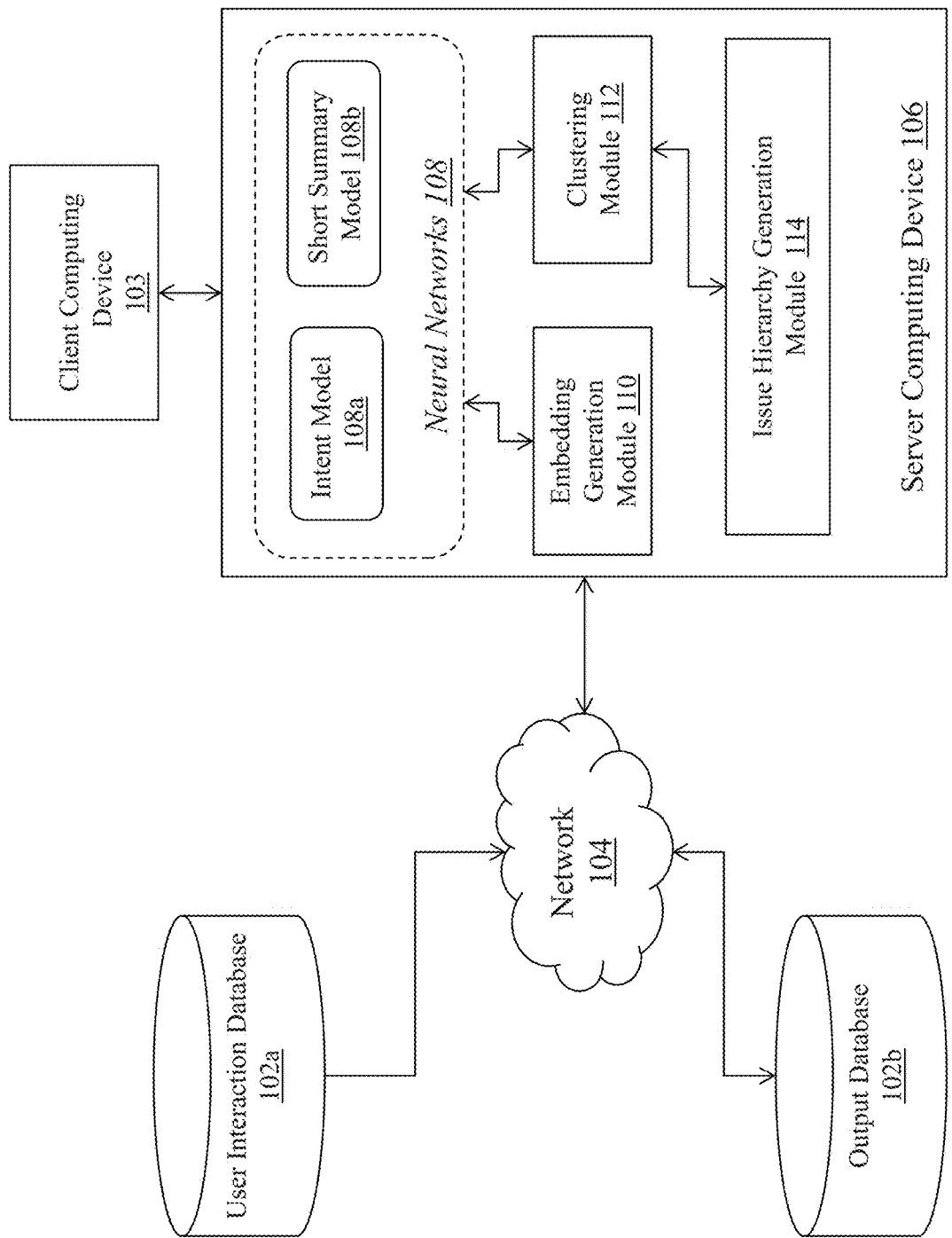
FIG. 1 is a block diagram of a system for automated analysis of customer interaction text to generate customer intent information and a hierarchy of customer issues.

FIG. 1 is a block diagram of a system 100 for automated analysis of customer interaction text to generate customer intent information and a hierarchy of customer issues. The system 100 includes user interaction database 102a, output database 102b, a client computing device 103, a communications network 104, a server computing device 106 that includes a plurality of neural networks 108a, 108b, an embedding generation module 110, a clustering module 112 and an issue hierarchy generation module 114.

The databases 102a, 102b are located on a single computing device (or in some embodiments, on a plurality of computing devices) coupled to the server computing device 106 and is configured to receive, generate, and store specific segments of data relating to the process of automated analysis of customer interaction text to generate customer intent information and a hierarchy of customer issues as described herein. In some embodiments, all or a portion of the databases 102a, 102b can be integrated with the server computing device 106 or be located on a separate computing device or devices. The databases 102a, 102b can be configured to store portions of data used by the other components of the system 100, as will be described in greater detail below. In some embodiments, the databases 102a, 102b are located in a cloud storage infrastructure comprising one or more nodes accessible by the server computing device 106.

The user activity database 102a includes historical user activity data, which in some embodiments is a dedicated section of the database 102*a* that contains specialized data used by the other components of the system 100 to perform at least a portion of the process of automated analysis of customer interaction text to generate customer intent information and a hierarchy of customer issues as described herein. Generally, the historical user activity data comprises data elements associated with prior interactions between one or more end users (e.g., customers) and one or more agents (such as customer service representatives (CSRs)). These interactions can include voice calls between end users and CSRs, live text chat sessions between end users and CSRs, and/or virtual assistant (VA) text chat sessions between an automated chat module at server computing device (not shown) and end users. In some embodiments, the user activity database 102*a* stores transcripts or other memorializations of the interaction—for example, in the case of a text chat session or a virtual assistant chat session, the database 102*a* can store unstructured text corresponding to the messages exchanged between the CSR/VA and the end user. In the case of a voice call, the database 102*a* can store a digital audio recording of the voice call and/or a transcript of the voice call (e.g. as generated by a speech-to-text module that converts the digital audio recording into unstructured text). In some embodiments, the database 102*a* also stores CSR notes or annotations input by the CSR (e.g. via client computing device 103) during the interaction with the end user. For example, a CSR may input a summary of the interaction (such as issues raised by the end user during the interaction, resolution of those issues, user-specific information such as demographics, account history, etc.) into a graphical user interface provided by client computing device 103. In some embodiments, the system can automatically retrieve additional information about the end user and/or the interaction (e.g., user profile information, user account information, user device information, and the like) from one or more data sources for integration into the CSR summary. These notes can be stored in database 102*a* in conjunction with the unstructured text and/or audio recording so that the complete interaction with the end user comprises the transcript of the interaction and the CSR notes/summary.

The output database 102*b* includes intents and short summaries generated by the system 100 from the above-referenced historical user activity data as will be described herein. Generally, the intents (also referred to as themes) comprise short descriptions (e.g., seven words or less) of a reason for a corresponding user interaction. One example of an intent could be "updated phone number"—indicating that the end user had interacted with a CSR or VA in order to provide an updated phone number for his or her account. Similarly, the short summaries are longer descriptions (e.g., more than seven words) that provide information about the interaction. One example of a short summary could be "updated phone number enrolled in voice capture"—indicating that the end user had updated his or her phone number and was enrolled in a voice capture and recognition program for future authentication to the system. As will be explained herein, these intents and short summaries are used by the system 100 to generate the issue hierarchy data structures.

The client computing device 103 connect to the communications network 104 in order to communicate with the server computing device 106 to provide input and receive output relating to the process for automated analysis of customer interaction text to generate customer intent information and a hierarchy of customer issues as described herein as described herein. The client computing device 103 can be coupled to a display device (not shown), such as a monitor or screen. For example, client computing device 103 can provide a graphical user interface (GUI) via the display device to a user of the corresponding device that presents output resulting from the methods and systems described herein and receives input from the user for further processing. In some embodiments, the client computing device 103 is operated by a CSR for analyzing and providing feedback on the automatically generated intents and short summaries as described herein.

Exemplary client computing devices 103 include but are not limited to desktop computers, laptop computers, tablets, mobile devices, smartphones, smart watches, Internet-of-Things (IoT) devices, and internet appliances. It should be appreciated that other types of computing devices that are capable of connecting to the components of the system 100 can be used without departing from the scope of invention. Although FIG. 1 depicts a single client computing device 103, it should be appreciated that the system 100 can include any number of client computing devices.

The communications network 104 enables the databases 102*a*, 102*b* and the server computing device 106 to communicate with each other. In some embodiments, the client computing device 103 is similarly connected to the network 104 in order to communicate with the server computing device 106. The network 104 is typically a wide area network, such as the Internet and/or a cellular network. In some embodiments, the network 104 is comprised of several discrete networks and/or sub-networks (e.g., cellular to Internet).

The server computing device 106 is a device including specialized hardware and/or software modules that execute on a processor and interact with memory modules of the server computing device 106, to receive data from other components of the system 100, transmit data to other components of the system 100, and perform functions for automated analysis of customer interaction text to generate customer intent information and a hierarchy of customer issues as described herein. The server computing device 106 includes several computing modules 108, 110, 112, 114 that execute on the processor of the server computing device 106. In some embodiments, the modules 108, 110, 112, 114 are specialized sets of computer software instructions programmed onto one or more dedicated processors in the server computing device 106 and can include specifically-designated memory locations and/or registers for executing the specialized computer software instructions.

Although the modules 108, 110, 112, 114 are shown in FIG. 1 as executing within the same server computing device 106, in some embodiments the functionality of the modules 108, 110, 112, 114 can be distributed among a plurality of server computing devices. As shown in FIG. 1, the server computing device 106 enables the modules 108, 110, 112, 114 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of the modules 108, 110, 112, 114 is described in detail below.

The neural networks 108 comprise an intent model 108*a* and a short summary model 108*b*. Each model 108*a*, 108*b* comprises a long short-term memory (LSTM) recurrent neural network (RNN) that is trained on historical user interaction data (e.g., from database 102*a*) for one or more contact channels (e.g., voice call, text chat, VA chat) to generate intents and/or short summaries for the corresponding user interaction from unstructured text (i.e. transcripts) of the interaction. It should be appreciated that, while FIG. 1 depicts two models 108a, 108b, the system 100 can comprise any of a number of different neural network models without departing from the scope of the technology described herein.

Figure 2:
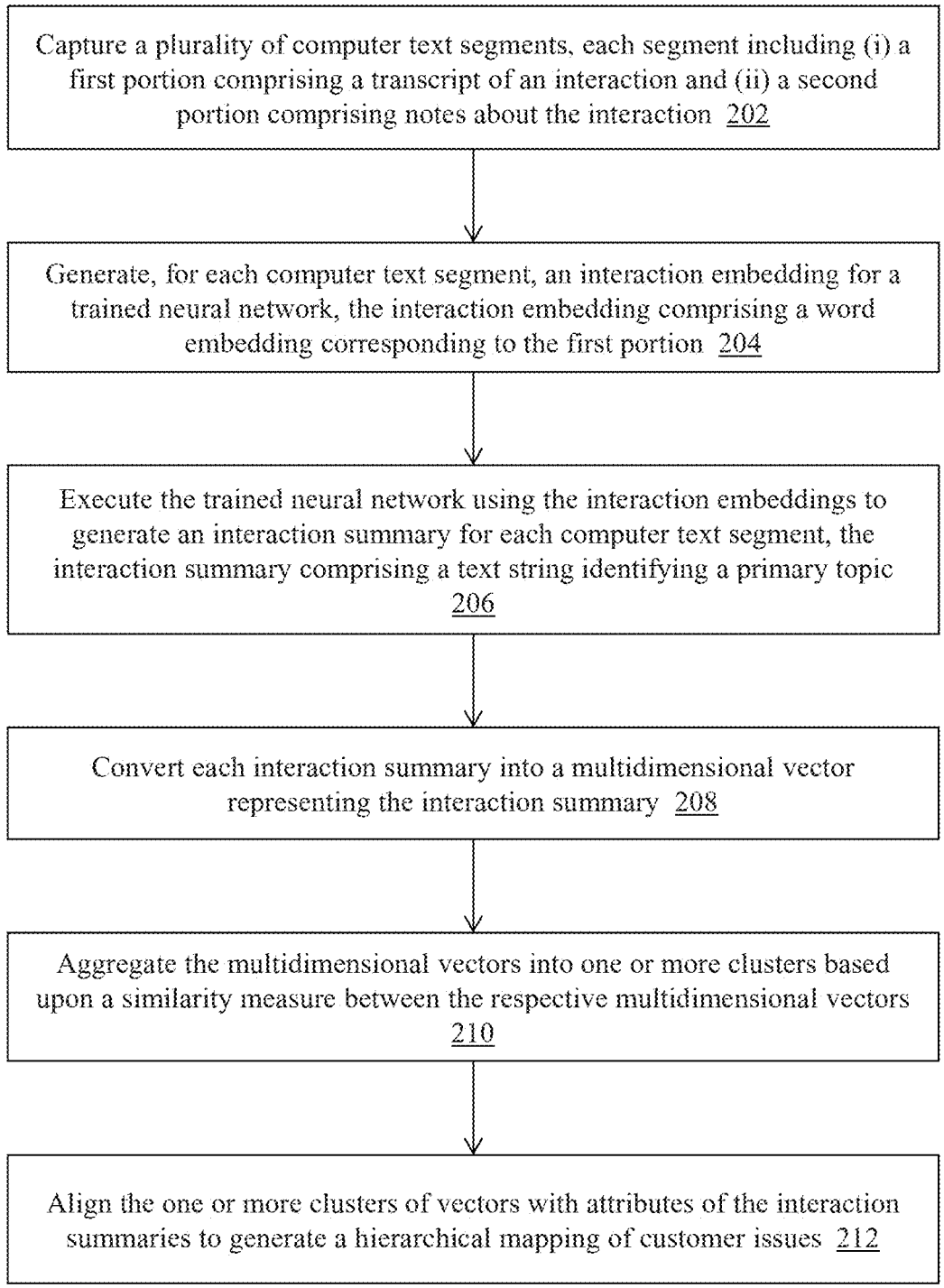
FIG. 2 is a flow diagram of a computerized method of automated analysis of customer interaction text to generate customer intent information and a hierarchy of customer issues.

FIG. 2 is a flow diagram of a computerized method 200 of automated analysis of customer interaction text to generate customer intent information and a hierarchy of customer issues, using the system 100 of FIG. 1. The embedding generation module 110 of server computing device 106 captures (step 202) a plurality of computer text segments from user interaction database 102a. Each computer text segment includes (i) a first portion comprising a transcript of an interaction and (ii) a second portion comprising notes about the interaction. In some embodiments, the computer text segment comprises unstructured text containing the transcript and the notes (e.g. CSR summary) stored in a database record or table for a given interaction. In some embodiments, the computer text segment is stored in a defined format (e.g., file type) in the database 102a. In some embodiments, the computer text segment includes one or more delimiters or special characters that separate the first portion from the second portion. In some embodiments, the computer text segment comprises only the transcript of the interaction without any corresponding notes from the CSR.

Figure 3:
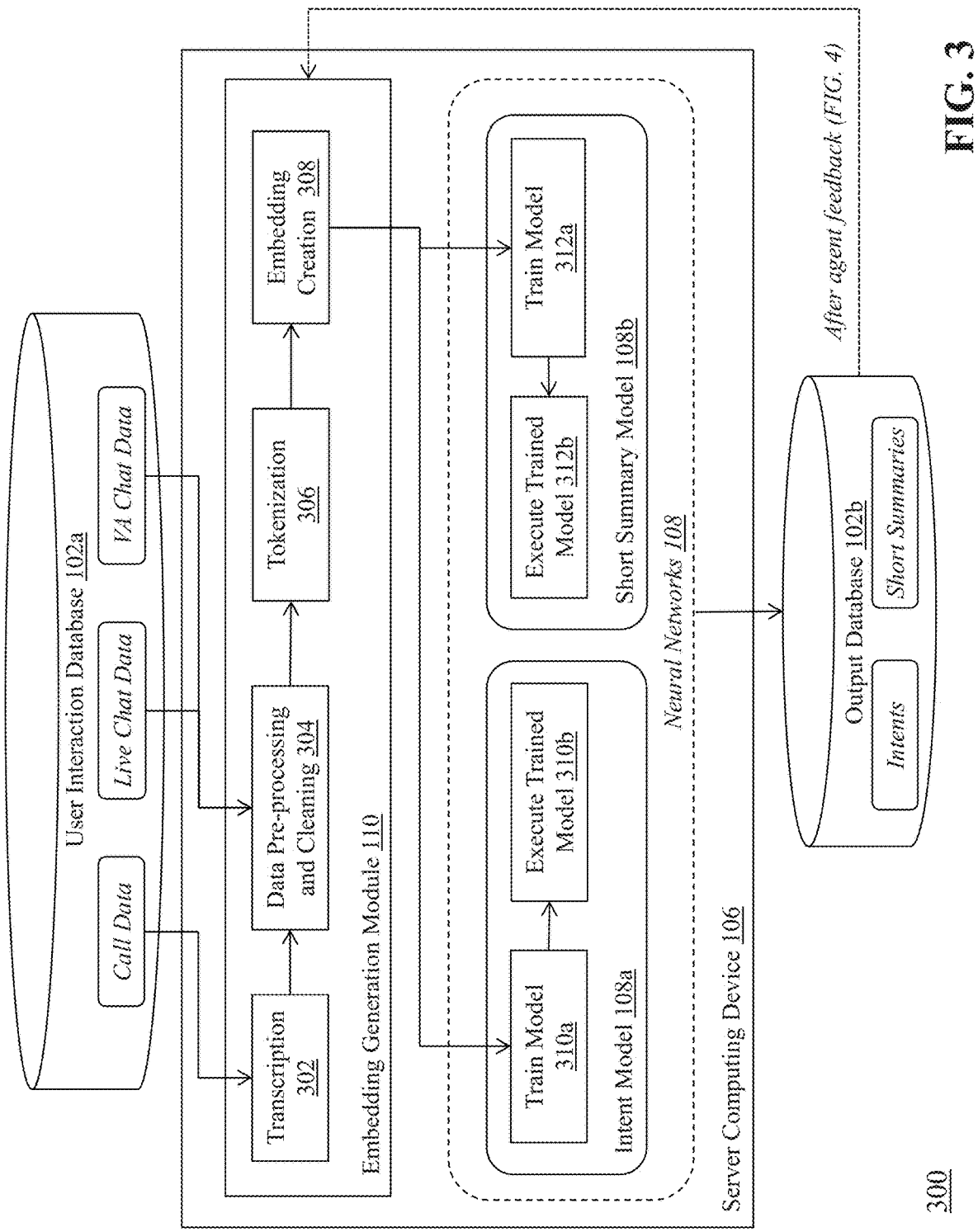
FIG. 3 is a detailed flow diagram of an illustrative embodiment of the processing performed by the embedding generation module and neural networks of the server computing device.

Also, in the case where the user interaction is a voice call, the database 102a can store a digital audio recording of the interaction instead of (or in addition to) the unstructured text of the transcript. In some embodiments, when only the digital audio recording is stored (e.g. as a .mp4 file), the system 100 can convert the audio into unstructured text using, e.g., a speech-to-text conversion module that analyzes the waveforms in the audio file and converts them into natural language text. FIG. 3 described below provides more detail regarding this optional step.

After capturing the user interaction data, the embedding generation module 110 generates (step 204), for each computer text segment, an interaction embedding for a trained neural network (i.e., intent model 108a and/or short summary model 108b). The interaction embeddings comprise a word embedding corresponding to the first portion of the computer text segment (i.e., the transcript of the user interaction). FIG. 3 is a detailed flow diagram 300 of an illustrative embodiment of the processing performed by the embedding generation module 110 of server computing device 106. As shown in FIG. 3, the embedding generation module 110 receives call data (i.e., audio files of voice calls), live chat data (i.e., text transcripts of live person-to-person chat sessions), and/or VA chat data (i.e., text transcripts of automated chat sessions between a user and an automated agent) from database 102a.

As mentioned above, in the case of a voice call, the embedding generation module 110 can optionally perform a transcription process (302) on the digital audio file (e.g. using speech-to-text) to convert the file into unstructured text. In some embodiments, the embedding generation module 110 can utilize two core functionalities to convert the voice segment(s) into text: speech recognition and grammar analysis. In one example, the embedding generation module 110 can use a speech recognition library, such as the Speech Recognition API available from Microsoft Corporation, to convert the digitized speech file into text. In some embodiments, the embedding generation module 110 can leverage external resources, such as a grammar library accessible via the internet, in order to accurately determine the words and phrases contained within the digital audio file. Also, in some embodiments, the embedding generation module 110 can utilize voice recognition functionality to distinguish between different speakers (e.g., end user vs. CSR) on a given voice call and generate the unstructured text for each participant accordingly. As can be appreciated, for live text chat data and VA text chat data, the embedding generation module 110 does not need to perform the above transcription step because that data is already in a computer text format.

The embedding generation module 110 then performs a data pre-processing and cleaning routine (304) on the incoming interaction text data. During the data pre-processing and cleaning routine, the embedding generation module 110 performs one or more tasks on the unstructured text to ensure that the text is in a form that can be used to generate embeddings as will be described later in the document. Exemplary pre-processing and cleaning tasks performed by the module 110 can include:

Removal of system messages: In some embodiments, the unstructured text data for user interaction transcripts may also contain auto-generated system messages such as "Party has left the session" or "This conversation will be recorded for quality purposes." These system messages do not relate to the substance of the user interaction and should be removed from the transcript so as to not create inaccurate analysis and generation of intents. The embedding generation module 110 identifies and filters these types of system messages by classifying them as 'noise' and removing them from the text transcript.

Lowercase conversion: the embedding generation module 110 can convert all of the text into lowercase to provide for uniform parsing and processing of the text data. This step can be performed on both voice call and text chat data.

Collapse multiple whitespaces into a single whitespace: the module 110 can detect sections of multiple whitespaces in a corpus of unstructured text and consolidate the whitespaces into a single whitespace (e.g., by removing the multiple whitespaces and replacing them with a single space). This step can be performed on both voice call and text chat data.

Replace end user-related masked information: the module 110 can determine end-user specific information that is sensitive or confidential (such as personally identifiable information (PII)) and mask this information in the transcript by, e.g., replacing the information with anonymizing overlay values—for example, if the end user says his or her name during the interaction, the transcript may include the name as part of an utterance by the end user (e.g., "My name is John Smith"). The module 110 can detect the name (by using a predefined dictionary of names, etc.) and replace the name with a mask (e.g., 'My name is [user name]'). This step can be performed on both voice call and text chat data.

Remove non-vocalized noise or unintelligible utterances: when converting a digital audio recording of a voice call, the module 110 may generate text that relates to non-vocalized noise and/or unintelligible words spoken by the participants. The module 110 can remove these words from the transcript by, e.g., determining whether they correspond to a recognized word in a predefined dictionary and if not, removing them from the text data. This step is performed only on voice call data.

Sort utterances in chronological order and combine all messages from an interaction: the module 110 can analyze the text data to confirm that the utterances made by both participants during the interaction are sorted according to chronological order by, e.g., using a timestamp allocated to specific utterances/messages in the interaction data, and further that all messages from a given interaction are included in the transcript. For example, during a text chat session, the system can assign a session identifier to all of the messages exchanged between the participants. In addition, in some embodiments the system can capture a customer identifier and/or an agent identifier in connection with the interaction. Then, the module 110 can use the session identifier, customer identifier, agent identifier and/or timestamp to select the messages allocated to the user interaction and ensure that all of the messages are contained in the transcript. This step can be performed on both voice call and text chat data.

Replace contractions: the module 110 can normalize certain contractions in the transcript (e.g., I've→I have; We haven't→We have not). For example, the module 110 can detect the contraction by comparing the words to a pre-defined dictionary and replacing them with the corresponding complete versions. This step can be performed on both voice call and text chat data.

Remove stopwords/stop-phrases: the module 110 can remove certain stopwords and/or stop-phrases from the corpus of text. Generally, stopwords are common words (e.g., the, and, or, etc.) that do not typically add useful context or meaning to the corpus of text. Many types of word embedding generators require the removal of stopwords before a corpus of text is processed. This step can be performed on both voice call and text chat data.

In some embodiments, the embedding generation module 110 can perform different or additional pre-processing and cleaning steps for the second portion of the computer text segment that the CSR notes about the interaction. As can be appreciated, in certain circumstances, the CSR notes about the interaction contain entity-specific, context-specific and/or agent-specific phrases and words that may not appear in the interaction transcript. For example, the CSR notes may contain shorthand references (e.g., stock symbols, business acronyms, etc.), pre-masked words (e.g., that refer to sensitive or personal information), formatted text (e.g., a date in the format 'mm/dd/yyy') that do not match up with the same words as spoken during the transcript—i.e., a user would speak the date as "Jun. 25, 2021" while a CSR may enter the date in the notes field as '6/25/2021.' The module 110 is configured to identify these notes-specific words and phrases (e.g., comparing them against a pre-defined dictionary of commonly-seen or used phrases or words that are notes-specific) and convert them into tokens as described below.

After the embedding generation module 110 has completed the pre-processing and cleaning the unstructured text data for the interactions, the module 110 converts the text data into interaction embeddings for processing by the neural networks 108a, 108b. Embedding generation is a two-step process: first, the module 110 tokenizes (306) the unstructured text into a plurality of tokens and then the module 110 generates interaction embeddings from the tokenized text. As can be appreciated, in some embodiments each token corresponds to a word in the corpus of text and a token is a fundamental unit that a text processing system typically works with. By generating tokens from the unstructured text, the module 110 can apply sophisticated algorithms, e.g., to identify the part-of-speech of each token, form trigrams that are used for other processing function like clustering described in detail below, etc.

When the transcript text has been tokenized, the embedding generation module 110 creates (308) the embeddings for the interaction that will be input into the intent model 108a and short summary model 108b for training and execution. In some embodiments, the tokenized words are provided to one or more one-hot encoders as input to create initial word embeddings that are passed to the models 108a, 108b. In a one-hot vector, the value for the corresponding word is 1 and the value for the other words in the overall vocabulary data set is 0. For example, if a vocabulary data set comprises the words (activate, phone, access, device, setup), the corresponding one-hot vectors for those words would be:

| Word | One-hot Vector |
| --- | --- |
| activate | (1, 0, 0, 0, 0) |
| phone | (0, 1, 0, 0, 0) |
| access | (0, 0, 1, 0, 0) |
| device | (0, 0, 0, 1, 0) |
| setup | (0, 0, 0, 0, 1) |

As can be appreciated, the vocabulary data set used for training the intent model 108a is different than the vocabulary data set used for training the short summary model 108b. As a result, the interaction embedding module 110 performs the tokenization 306 and one-hot word vector creation twice on each computer text segment comprising the interaction transcript and the CSR notes, once for the intent model 108a and once for the short summary model 108b.

In some embodiments, the interaction embedding module 110 can generate specific word embeddings for each of the intent model 108a and short summary model 108b after evaluating the number of tokens that are contained in the CSR notes. For example, for a computer text segment where the number of tokens in the CSR notes is greater than a predetermined threshold (e.g., seven tokens), the module 110 can generate word embeddings from the computer text segment that are only used for training and execution of the short summary model 108b. Likewise, for a computer text segment where the number of tokens in the CSR notes is at or below the predetermined threshold, the module 110 can generate word embeddings from the computer text segment that are only used for training and execution of the intent model 108a. It should be appreciated that other methodologies for generating word embeddings for the models 108a, 108b can be contemplated for use with the module 110.

Upon generation of the initial word embeddings for each of the intent model 108a and short summary model 108b, the embedding generation module 110 transmits the corresponding embeddings to the respective models 108a, 108b for training and/or execution. In some embodiments, each of the models 108a, 108b comprises a LSTM recurrent neural network with attention mechanism. Generally, a neural network (NN) is a computer data model comprising three layers: an input layer, a hidden layer, and an output layer. A recurrent neural network (RNN) adds recursions (also called loops) in its hidden layer to enable the RNN to process variable length sequences of inputs (such as sentences). Exemplary algorithms for implementing the LSTM RNN are described in S. Hochreiter and J. Schmidhuber, "LSTM Can Solve Hard Long Time Lag Problems," *NIPS'96: Proceedings of the 9th International Conference on Neural Information Processing Systems* (December 1996), pp. 473-479, which is incorporated herein by reference.

As shown in FIG. 3, the intent model 108a uses at least a portion of the word embeddings received from the module 110 as training data—in that the model 108a uses embeddings created from existing interaction transcript data and CSR notes data to train (310a) the model to generate intents that are then confirmed as accurate with corresponding existing intent data for the interactions within an accuracy tolerance. Once the model 108a is trained, the server computing device 106 can subsequently execute (310b) the trained model 108a using as input interaction embeddings generated from new interactions to automatically generate an intent for the interaction transcript and CSR notes to which the new interactions correspond.

Similarly, the short summary model 108b uses at least a portion of the word embeddings received from the module 110 as training data—in that the model 108b uses embeddings created from existing interaction transcript data and CSR notes data to train (312a) the model to generate short summaries that are then confirmed as accurate with corresponding existing short summary data for the interactions within an accuracy tolerance. Once the model 108b is trained, the server computing device 106 can subsequently execute (312b) the trained model 108b using as input interaction embeddings generated from new interactions to automatically generate a short summary for the interaction transcript and CSR notes to which new interactions correspond. Upon execution of the intent model 108a and/or the short summary model 108b against computer text segments from new interactions, the server computing device 106 stores the output (i.e., the intents and/or short summaries generated by the models 108a, 108b) in the output database 102b.

Figure 4:
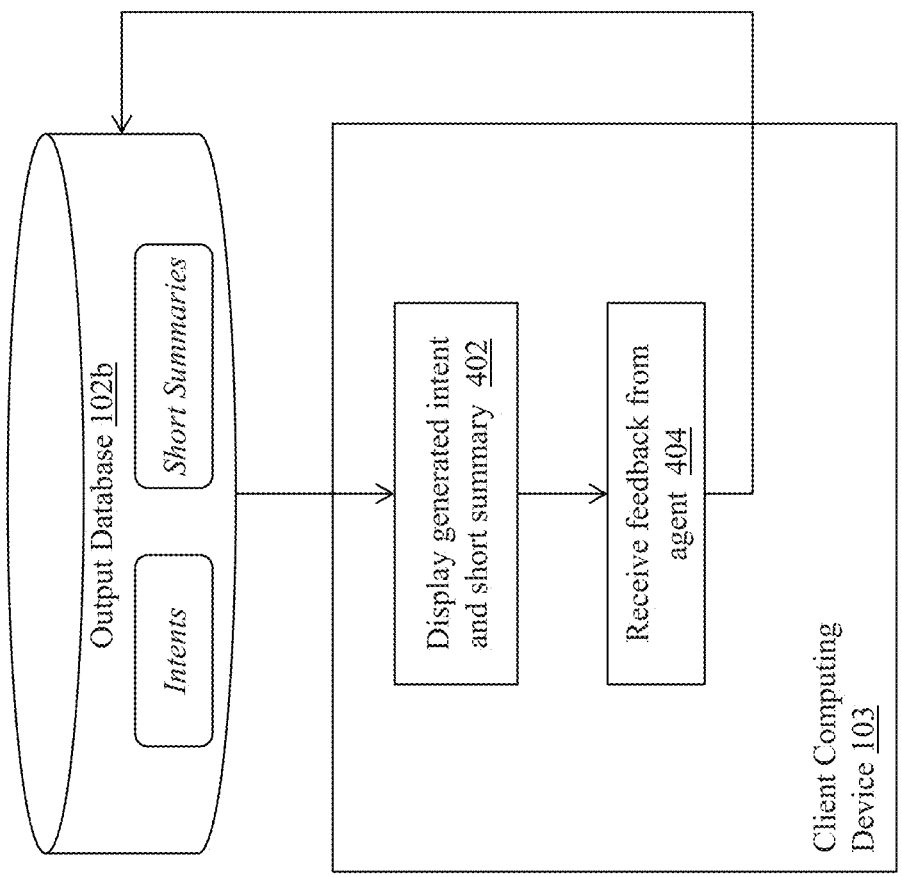
FIG. 4 is a detailed flow diagram of an illustrative embodiment of the intent and short summary feedback generation process performed by the client computing device.

In one example dataset, the intent model 108a and the short summary model 108b exhibit accuracy of more than 78% as a result of the training process. However, it is important for each of the models 108a 108b to keep learning from newer interactions to thereby improve the accuracy score. To achieve the continued learning and increased accuracy, the system 100 can obtain feedback on the model-generated intent data and short summary data from the CSR that participated in the interaction. FIG. 4 is a detailed flow diagram 400 of an illustrative embodiment of the intent and short summary feedback generation process performed by the client computing device 103 of the system 100. As shown in FIG. 4, upon the conclusion of an interaction between a CSR and a customer, the client computing device 103 (i.e., the device at which the CSR is located) retrieves intents and/or short summaries from the output database 102b that were automatically generated by the models 108a, 108b from the transcript data and CSR notes data upon conclusion of the interaction.

Figure 5:
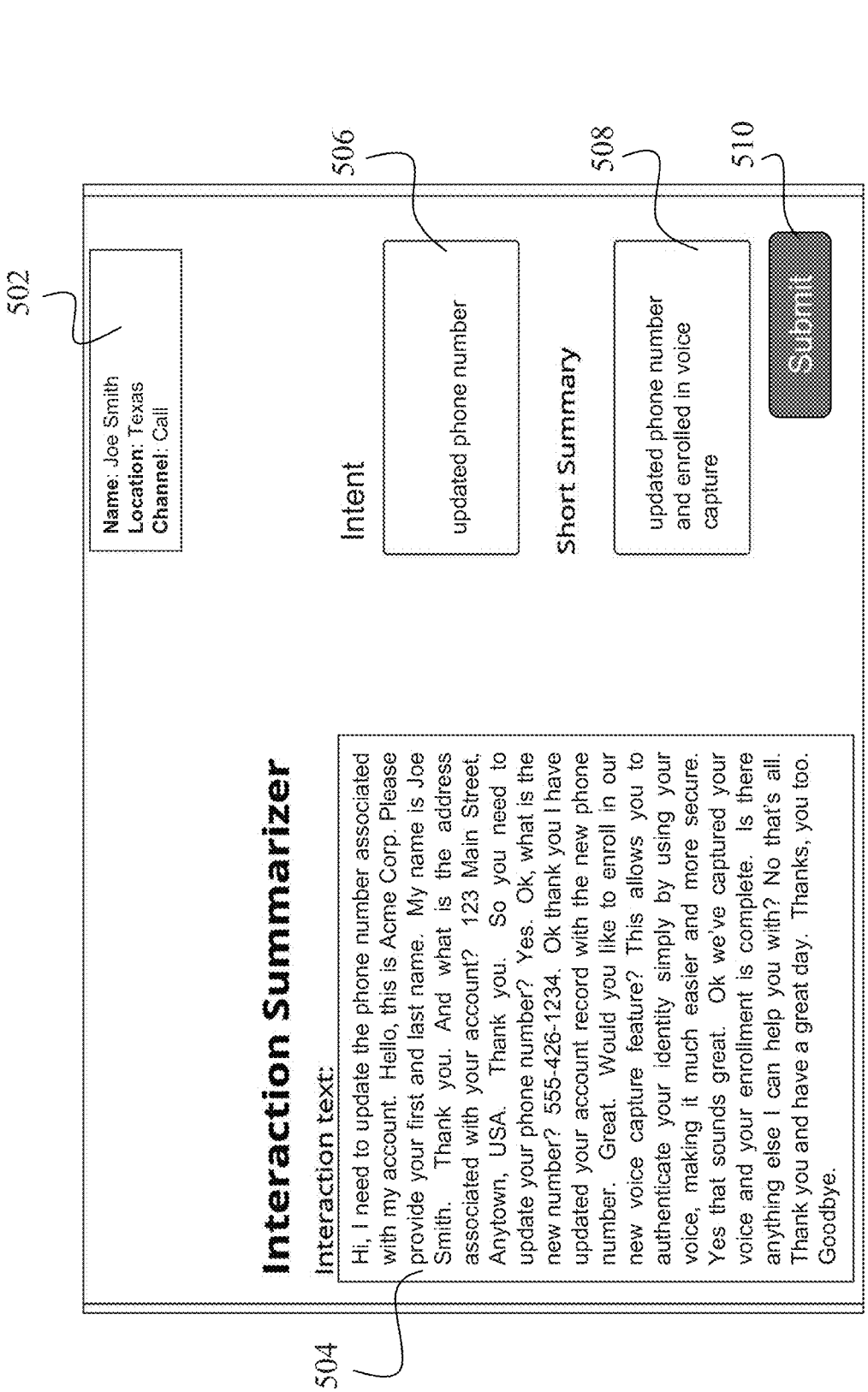
FIG. 5 is a diagram of a graphical user interface generated by the client computing device to receive feedback on intents and short summaries generated by the server computing device.

The client computing device 103 generates a graphical user interface that displays (step 402) the generated intent and/or short summary as created by the models 108a, 108b from the computer text segment that contains the interaction data. FIG. 5 is a diagram of a graphical user interface 500 generated by the client computing device 103 to receive feedback on intents and short summaries generated by the models 108a, 108b of server computing device 106. The graphical user interface 500 comprises a customer identification and channel identification panel 502, which displays the identity of the customer, the location from which the customer contacted the CSR, and the channel (e.g., call, live chat, etc.) via which the customer contacted the CSR. In this case, the customer communicated with the CSR via a voice call.

The graphical user interface 500 also displays the computer text segment 504 corresponding to the voice call transcript of the interaction. As shown in 504, the computer text segment comprises unstructured text including the utterances from the customer and the CSR. During the call, the customer said "I need to update the phone number associated with my account," and the CSR responded by updating the phone number. The intent area 506 and the short summary area 508 contain the intent and short summary, respectively, that were generated from the computer text segment 504 by the models 108a, 108b of server computing device 106. As shown in FIG. 5, the intent 506 generated by the model 108a is 'updated phone number' and the short summary generated by the model 108b is 'updated phone number and enrolled in voice capture.'

The client computing device 103 can receive feedback (step 404) from the agent/CSR by enabling the CSR to modify the text contained in the intent and/or short summary fields 506, 508 in order to correct and/or enhance the data contained therein. For example, the model 108a could have generated an intent for the call that reads 'updated address,' e.g. via misinterpretation of the computer text segment. Because the actual customer intent for the call was to update his phone number, the CSR can edit the text in the intent field 506 to reflect the correct intent. It should be appreciated that in some embodiments, the CSR is able to enter freeform text in the intent and short summary fields 506, 508, while in some embodiments the CSR is limited to, e.g., specific terms and/or phrases—by selecting from a predefined list or the like. Once the CSR is satisfied with any changes made to the intent or short summary text, the CSR can select the submit button 510, which stores the changes in the output database 102b. In some embodiments, after the CSR has saved the changes to output database 102b, the updated intent data and short summary data is transmitted back to the embedding generation module 110 so that the updated data can be used to train the respective models 108a, 108b in order to improve the accuracy of the models (see FIG. 3). In this manner, the system 100 advantageously leverages CSR feedback to refine the intent generation and short summary generation processes to result in more accurate and complete intents and short summaries.

After updating of the intents and short summaries by the CSR, the next phase of the process begins—which centers on the generation of a hierarchy of customer issues from the interactions. Beneficially, the generation of the customer issue hierarchy enables the enterprise to identify trends and convergence of issues by clustering them based upon meaning, product, sub-product, etc.—which makes information gleaned from customer interactions much more accessible and actionable.

FIG. 6 is a detailed flow diagram 600 of an illustrative embodiment of the processing performed by the clustering module 112 and the issue hierarchy generation module 114 of the server computing device 106 of system 100. As shown in FIG. 6, the clustering module 112 retrieves the intent data and short summary data from output database 102b (after agents have provided feedback as described above). The clustering module 112 performs a data pre-processing and cleaning step (602) and a normalization step (604), similar to step 304 performed by the embedding generation module 110 (described previously), where the module 112 executes one or more tasks on the unstructured text of the intents and short summaries to ensure that the text is in a form that can be used to generate embeddings. For example, when updating the intents or short summaries, a CSR may add text that is not in a preferred form for generating embeddings-so the module 112 pre-processes, cleans, and normalizes this text. Exemplary tasks include, but are not limited to, lower case conversion, acronym/stock ticker replacement, repeated word replacement, contraction replacement, or any of the other tasks described above in FIG. 3.

FIG. 7 is a diagram showing exemplary intents generated by the system 100 before and after the pre-processing and cleaning step 602 and normalizing step 604. As shown in FIG. 7, the automatically generated intents 702 (as updated by CSRs during the feedback process) are converted into cleaned and normalized intents 704.

Next, the clustering module 112 performs the embedding creation step (606) to generate word/phrase embeddings based upon the cleaned intents and/or short summaries. Vectorization and embedding generation is important in this phase because two intents (as modified by CSRs) could have the same meaning but could be written differently. For example, the intents 'reset password' and 'get new credentials' could both relate to a customer requesting a password reset—but if these intents are simply clustered by word choice or vocabulary, the system would not assign them to the same cluster, leading to erroneous issue hierarchy generation. In some embodiments, the module 112 executes a pretrained language model using the cleaned intents and/or short summaries as input to generate the embeddings. Exemplary pretrained language models that can be used in the clustering module 112 include, but are not limited to, BERT (as described in J. Devlin et al., "BERT: Pre-training of Deep Bidirectional Transformers for Language Understanding," May 24, 2019, available at arxiv.org/pdf/1810.04805v2, incorporated herein by reference), RoBERTa (as described in Y. Liu et al., "RoBERTa: A Robustly Optimized BERT Pretraining Approach," Jul. 26, 2019, available at arxiv.org/pdf/1907.11692v1, incorporated herein by reference), and XLNet (as described in Z. Yang et al., "XLNet: Generalized Autoregressive Pretraining for Language Understanding," Jan. 2, 2020, available at arxiv.org/pdf/1906.08237v2, incorporated herein by reference). In one example, the module 112 using a large version of a RoBERTa model generates an embedding of 1,024 dimensions representing the intent. These generated embeddings preserve the syntactic and semantic meaning of the intent, which assists in clustering similar intents and summaries together.

FIG. 8 is a diagram showing exemplary embeddings generated by the system 100 from the cleaned and normalized intents. As shown in FIG. 8, the cleaned and normalized intents 802 are converted into a multidimensional embedding (or vector) comprising feature values (e.g., 0.2, 0.65 . . . ) corresponding to the features of the intent detected by the clustering module 112.

Figure 9:
FIG. 9 is a diagram showing exemplary standardized embeddings generated by the system from the initial embeddings.

As can be appreciated, an embedding with large dimensionality can be difficult and/or time-consuming for the module 112 to cluster and assign to a hierarchy due to the embedding's size. As a result, the clustering module 112 performs a dimensionality reduction step (608) to convert the large dimension embedding into a form that is more efficient for the grouping and clustering steps described herein. A first part of the dimensionality reduction step 608 comprises standardization of the embeddings. The clustering module 112 can use any of a variety of different standardization methods, such as minmax-scaling (e.g., MinMaxScaler described at scikit-learn.org/stable/modules/generated/sklearn.preprocessing. MinMaxScaler.html) and standard-scaling (e.g., StandardScaler described at scikit-learn.org/stable/modules/generated/sklearn.preprocessing. StandardScaler.html). In one embodiment, the module uses standard-scaling for each feature of the embedding, which removes the mean of the feature and scales the feature to unit variance, as shown in the following algorithm:

$$z = \frac{(x - \mu)}{\sigma}$$

where $\mu$ is the mean of the feature, $\sigma$ is the standard deviation of the feature, x is the initial feature value and z is the standardized feature value. FIG. 9 is a diagram showing exemplary standardized embeddings 904 generated by the system 100 from the initial embeddings 902. As shown in FIG. 9, the standardized embeddings 904 have feature values that have been processed according to the standard-scaling algorithm described above.

Figure 10:
FIG. 10 is a diagram showing exemplary embeddings generated by the system upon performing dimensionality reduction on the standardized embeddings.

The module 112 then performs the dimensionality reduction on the standardized embedding, which helps in reducing the dimensions significantly (e.g., from 1,024 to ~100) while still preserving the meaning of the embedding. An exemplary algorithm used by the module 112 to perform dimensionality reduction is principal component analysis (PCA), as described in M. Brems, "A One-Stop Shop for Principal Component Analysis," Apr. 17, 2017, available at towardsdatascience.com/a-one-stop-shop-for-principal-component-analysis-5582fb7e0a9c, which is incorporated herein by reference. FIG. 10 is a diagram showing exemplary embeddings 1004 generated by the system 100 upon performing dimensionality reduction on the standardized embeddings 1002. As shown in FIG. 10, the reduced dimension embeddings 1004 contain a reduced set of features (~100) versus the standardized embeddings 1002, which can contain over 1,000 features.

After dimensionality reduction, the clustering module 112 performs entity detection (610) on the text of the intents and short summaries using a named entity recognition (NER) model that is trained to identify organization-specific products, services, and other types of entities. The module 112 can tag each of the intents and short summaries with one or more keywords that correspond to the detected entities. An exemplary NER model used by the module 112 is SpaCy NER, available at spacy.io, and as described in A. Tripathi, "Named Entity Recognition NER using spaCy|NLP|Part 4," Apr. 26, 2020, available at towardsdatascience.com/named-entity-recognition-ner-using-spacy-nlp-part-4-28da2ece-57c6, which is incorporated herein by reference.

The NER model can be configured to recognize specific named entities—in the context of a financial services organization, some named entities may include '401(k),' 'IRA,' 'Insurance,' 'Brokerage,' and other types of products or services. The NER model further can be configured to identify small variations in entity names, alternate entity names, etc. and tag the intents or short summaries using one common name. For example, the clustering module 112 can execute the NER model against the following intents: "opening 403(b) plan" and "opening tax sheltered annuities plan." The NER model identifies the entity '403(b)' in the first intent, and 'tax sheltered annuities' in the second intent. The NER model can tag each of these intents with the tag '403(b)' as a common tag covering both entities. FIG. 11 is a diagram showing exemplary entities 1104 detected by the system 100 from the cleaned intents, using an NER model. As shown in FIG. 11, the module 112 detects the entity 'electronic fund transfer' from the first four intents in 1102, the module detects 112 the entities 'ekit for electronic fund transfer,' and 'electronic fund transfer' from the next five intents, the module 112 detects the entity 'ESPP' in the next four intents, and the module 112 detects the entity 'wire transfer' in the last three intents.

As can be appreciated, the intent or short summary for a specific customer interaction is typically a combination of one or more entities (i.e., products and/or services that the interaction is based upon) and the customer query, action, and/or activity relating to the entities (i.e., ask question about products and/or services, etc.). Therefore, the clustering module 112 advantageously groups the intents or short summaries (step 612) according to the entity tags assigned to each intent or short summary. Each intent/short summary is assigned to a group based upon the tags, and the module 112 can then use the text of the intent/short summary and the reduced dimension embedding corresponding to the intent/short summary to cluster them and generate the issue hierarchy. FIG. 12 is a diagram of exemplary grouping performed by the system 100 on the tagged intents. As shown in FIG. 12, each of the first four intents are grouped into the 'electronic fund transfer' group (which corresponds to the detected entity in FIG. 11), the next five intents are grouped into the 'ekit for electronic fund transfer' group, the next four intents are grouped into the 'ESPP' group, and the last three intents are grouped into the 'wire transfer' group.

Continuing with FIG. 6, the clustering module 112 performs recursive clustering (614) on the intents/short summaries and their embeddings to cluster the intents and short summaries into smaller cohorts of high similarity. The clustering module 112 can use any of a number of clustering algorithms, including but not limited to agglomerative hierarchical clustering, K-means clustering, etc. In one embodiment, the module 112 uses agglomerative hierarchical clustering because it can be difficult to know the number of clusters beforehand (which is not a requirement of agglomerative hierarchical clustering). Exemplary agglomerative hierarchical clustering algorithms are described in W. Day & H. Edelsbrunner, "Efficient algorithms for agglomerative hierarchical clustering methods," Journal of Classification 1, 7-24 (1984), which is incorporated herein by reference. The module 112 performs the agglomerative hierarchical clustering recursively on the intent groupings generated at the previous step (612), using the embeddings as input:

1) The module 112 clusters the generated intent embeddings that have at least x similarity (e.g., by comparing the embeddings using a distance or similarity metric—such as cosine similarity, as described at en.wikipedia.org/wiki/Cosine_similarity, incorporated herein by reference).
2) The module 112 then calculates the centroid of each of the newly-formed embedding clusters.
3) The above cluster centroids are assigned into further clusters that have at least $x=x-\Delta x$ similarity.
4) In some embodiments, steps 2 and 3 are repeated multiple times. For example, where the module 112 is configured to generate a three-tiered or three-leveled cluster hierarchy, the module 112 can perform steps 2 and 3 two times to generate the proper hierarchy. In this example, the similarity threshold for the first level can be $x=0.85$, while for subsequent levels the similarity threshold is relaxed by $\Delta x=0.05$—meaning that the second level similarity threshold is 0.80 and the third level similarity threshold is 0.75.

FIG. 13 is a diagram of an exemplary cluster hierarchy generated by the system 100. As shown in FIG. 13, the module 112 performed the recursive clustering three times, resulting in a four-tiered cluster hierarchy. Tier one comprises the cleaned intents 1302, tier two comprises the level one clusters (shown previously in FIG. 12), tier three comprises level two clusters 1306 (which groups the first two level one clusters into a single 'electronic fund transfer' cluster), and tier four comprises level three clusters 1308 (which clusters the 'electronic fund transfer' and 'wire transfer' groups together into a single 'money movement' cluster).

In some embodiments, the module 112 can rank each of the clusters at each tier of the hierarchy according to, e.g., the total number of interactions associated with each cluster. This enables an efficient understanding of which clusters may be more relevant, important, and/or useful than others.

The clustering module 112 can then transmit the embedding cluster hierarchy to the issue hierarchy generation module 114 of server computing device 106. The module 114 performs the step of mapping the embedding clusters to issues (step 616) and generating the issue hierarchy based upon the mapped clusters (step 618). In step 616, the module 114 maps the tags and/or detected entities for each embedding cluster (as detected in steps 610, 612, 614) to the corresponding cluster in the hierarchy. For example, where embeddings in a cluster are each tagged with the common tag of 401(k), the module 114 can assign the tag '401(k)' to the cluster in the hierarchy. The module 114 can then generate the issue hierarchy using the tags or entities assigned to each cluster and display the generated issue hierarchy in a graphical user interface at, e.g., client computing device 103 and/or another remote computing device. As can be appreciated, the lowest level in the issue hierarchy can be the intents and/or short summaries that were automatically generated by the models 108a, 108b as described above as updated by the CSR (see FIG. 4). This provides a user with a more complete view of the actual issue that the customers had faced.

FIG. 14 is a diagram of an exemplary graphical user interface that displays a portion of the fully-generated issue hierarchy as described above. As shown in FIG. 14, the issue hierarchy comprises a multi-faceted data structure that includes several tiers of clusters, each of which can be expanded (e.g., using an interface feature such as expander 1402) to drill down on specific intents, products, issues, etc. The top-tier cluster 'money movement' can be expanded to show the clusters 'electronic fund transfer,' 'sent ekit for electronic fund transfer,' 'journal,' 'wire instructions' in the next tier to the right, and so forth. The user interface also displays the count 1404 of how many interactions correspond to each cluster of issues-providing the user with insight into the most frequent intents presented by customers. It should be appreciated that the user interface shown in FIG. 14 represents only a portion of the entire issue hierarchy, as the hierarchy can contain additional issues and/or groups can be further expanded to view more detailed information.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computerized method of automated analysis of customer interaction text to generate customer intent information and a hierarchy of customer issues, the method comprising:

capturing, by a server computing device, a plurality of computer text segments, each segment including (i) a first portion comprising a transcript of an interaction between a customer and an agent and (ii) a second portion comprising notes about the interaction between the customer and the agent, as generated by the agent;

generating, by the server computing device, first embeddings for a trained intent classification model by selecting computer text segments that have a quantity of tokens in the second portion that is at or below a threshold quantity and converting each selected computer text segment into a multidimensional vector representing the computer text segment using a first one-hot encoder;

generating, by the server computing device, second embeddings for a trained short summary generation model by selecting computer text segments that have a quantity of tokens in the second portion that is above the threshold quantity and converting each selected computer text segment into a multidimensional vector representing the computer text segment using a second one-hot encoder;

executing, by the server computing device, the trained intent classification model using the first embeddings as input to generate a predicted customer intent for each computer text segment;

executing, by the server computing device, the trained short summary generation model using the second embeddings as input to generate a predicted short summary for each computer text segment;

combining, by the server computing device, the predicted customer intent and the predicted short summary for each computer text segment into an interaction summary for the computer text segment;

converting, by the server computing device, each interaction summary into a multidimensional vector representing the interaction summary using a trained language model;

assigning, by the server computing device, one or more entity tags to each interaction summary using a trained named entity recognition model;

grouping, by the server computing device, the interaction summaries based upon the assigned entity tags;

aggregating, by the server computing device, the multidimensional vectors representing the interaction summaries into one or more clusters based upon a similarity measure between the respective multidimensional vectors; and aligning, by the server computing device, the one or more clusters of vectors with the groups of the interaction summaries to generate a hierarchical mapping of customer issues.

2. The method of claim 1, wherein the server computing device cleans the computer text segments before generating the first embeddings and the second embeddings.

3. The method of claim 2, wherein cleaning the computer text segment comprises one or more of: removal of stopwords, removal of system messages, conversion to lower case, consolidate white space, replacement of masked information, removal of non-vocalized noise, or replacement of contractions.

4. The method of claim 1, wherein the trained intent classification model and the trained short summary generation model each comprises a Long Short-term Memory (LSTM) architecture.

5. The method of claim 1, wherein the interaction between a customer and an agent comprises a voice call session or a text chat session.

6. The method of claim 1, wherein the multidimensional vectors representing the interaction summaries are phrase embeddings.

7. The method of claim 1, wherein the server computing device standardizes the multidimensional vectors representing the interaction summaries and reduces a number of dimensions of each multidimensional vector representing the interaction summaries.

8. The method of claim 1, wherein the server computing device captures one of the computer text segments for a current interaction between the customer and the agent as soon as the current interaction between the customer and the agent is concluded.

9. The method of claim 8, wherein the server computing device:
   transmits the predicted customer intent and the predicted short summary generated for the current interaction for display on a computing device of the agent;
   receives a change to at least one of the predicted customer intent and the predicted short summary from the computing device of the agent; and
   combines the received customer intent and the received short summary into the interaction summary.

10. A system of automated analysis of customer interaction text to generate customer intent information and a hierarchy of customer issues, the system comprising a server computing device with a memory for storing computer-executable instructions and a processor that executes the computer-executable instructions to:
   capture a plurality of computer text segments, each segment including (i) a first portion comprising a transcript of an interaction between a customer and an agent and (ii) a second portion comprising notes about the interaction between the customer and the agent, as generated by the agent;
   generate first embeddings for a trained intent classification model by selecting computer text segments that have a quantity of tokens in the second portion that is at or below a threshold quantity and converting each selected computer text segment into a multidimensional vector representing the computer text segment using a first one-hot encoder;
   generate second embeddings for a trained short summary generation model by selecting computer text segments that have a quantity of tokens in the second portion that is above the threshold quantity and converting each selected computer text segment into a multidimensional vector representing the computer text segment using a second one-hot encoder;
   execute the trained intent classification model using the first embeddings as input to generate a predicted customer intent for each computer text segment;
   execute the trained short summary generation model using the second embeddings as input to generate a predicted short summary for each computer text segment;
   combine the predicted customer intent and the predicted short summary for each computer text segment into an interaction summary for the computer text segment;
   convert each interaction summary into a multidimensional vector representing the interaction summary using a trained language model;
   assign one or more entity tags to each interaction summary using a trained named entity recognition model;

group the interaction summaries based upon the assigned entity tags;

aggregate the multidimensional vectors representing the interaction summaries into one or more clusters based upon a similarity measure between the respective multidimensional vectors; and align the one or more clusters of vectors with the groups of the interaction summaries to generate a hierarchical mapping of customer issues.

11. The system of claim 10, wherein the server computing device cleans the computer text segments before generating the first embeddings and the second embeddings.

12. The system of claim 11, wherein cleaning the computer text segment comprises one or more of: removal of stopwords, removal of system messages, conversion to lower case, consolidate white space, replacement of masked information, removal of non-vocalized noise, or replacement of contractions.

13. The system of claim 10, wherein the trained intent classification model and the trained short summary generation model each comprises a Long Short-term Memory (LSTM) architecture.

14. The system of claim 10, wherein the interaction between a customer and an agent comprises a voice call session or a text chat session.

15. The system of claim 10, wherein the multidimensional vectors representing the interaction summaries are phrase embeddings.

16. The system of claim 10, wherein the server computing device standardizes the multidimensional vectors representing the interaction summaries and reduces a number of dimensions of each multidimensional vector representing the interaction summaries.

17. The system of claim 10, wherein the server computing device captures one of the computer text segments for a current interaction between the customer and the agent as soon as the current interaction between the customer and the agent is concluded.

18. The system of claim 17, wherein the server computing device:

transmits the predicted customer intent and the predicted short summary generated for the current interaction for display on a computing device of the agent;

receives a change to at least one of the predicted customer intent and the predicted short summary from the computing device of the agent; and combines the received customer intent and the received short summary into the interaction summary.

* * * * *